United States Patent [19]

Koike

[11] Patent Number: 4,573,150
[45] Date of Patent: Feb. 25, 1986

[54] SELF-HOLDING SWITCH FOR USE IN A SOUND REPRODUCING DEVICE

[75] Inventor: Eishi Koike, Sagamihara, Japan

[73] Assignee: Ozen Corporation, Tokyo, Japan

[21] Appl. No.: 633,866

[22] Filed: Jul. 24, 1984

[30] Foreign Application Priority Data

Jul. 29, 1983 [JP] Japan .................. 58-138981

[51] Int. Cl.[4] .................. G11B 17/06; A63H 3/33
[52] U.S. Cl. .................. 369/67; 369/63
[58] Field of Search .................. 369/63, 65, 66, 67, 369/31

[56] References Cited

U.S. PATENT DOCUMENTS

| | | | |
|---|---|---|---|
| 4,027,887 | 6/1977 | Watanabe | 369/65 |
| 4,347,595 | 8/1982 | Ngai | 369/67 |
| 4,498,160 | 2/1985 | Koike | 369/67 |

Primary Examiner—Steven L. Stephan
Attorney, Agent, or Firm—Basile, Weintraub & Hanlon

[57] ABSTRACT

A movable contact 4 is fabricated of a spring wire, the halfway portion of which is wound around a pin 5. One lengthwise end of the wire rests on a casing and the other lengthwise end is rested at the halfway portion of an L-shaped lever 6 received by the pin 5, the pin being coaxial with the movable contact 4. A fixed contact 7 is disposed at a position where it can engage the movable contact 4 at its portion halfway between the point rested on the lever 6 and the portion being wound around the pin. A portion or arm of the lever 6 can extend toward and contact a pickup 3 returned to the starting point of sound reproduction. That portion of the lever 6 is spaced from the pin 5 a distance longer than the part or arm of the lever 6 associated with the movable contact 4. By virtue of this construction, the device is able to perform exact switching action without requiring any particular delicate adjustment in connection with the resilient force of each return or coil spring 1.

2 Claims, 2 Drawing Figures

SELF-HOLDING SWITCH FOR USE IN A SOUND REPRODUCING DEVICE

BACKGROUND OF THE INVENTION

1. Field of the Invention

This invention relates to a self-holding switch for use in a sound reproducing device. More particularly, the present invention relates to a self-holding switch in which a movable contact is fabricated of a spring wire, a medical or halfway portion of which is wound around a pin and its one free end is rested on the casing of a sound reproducing device, while the other free end is rested on the medial or halfway portion of a lever which is received by the pin and, also, is coaxial with the movable contact.

2. Prior Art

Sound reproducing devices, particularly, the most simplified of sound reproducing devices, are constructed to have a pickup normally urged toward the starting point of sound reproduction by a return spring. The pickup is held in position by the resilient force of the return spring. When the pickup has returned to the starting point of sound reproduction for the next playing, the movable contact of a self-holding switch, which had previously been positioned at the starting point of sound reproduction, is detached from engagement with the fixed contact and cuts off the power to a motor driving the record disc. In this kind of sound reproducing device, the motor, which rotates the record disc, is started by a starting switch connected in parallel to the self-holding switch. Then, the movable contact of the self-holding switch held in place by the pickup is released by the movement of the pickup from the starting point toward the end point of sound reproduction, subsequent to the starting of the record disc. This results in contact between the movable contact and the fixed contact which, in turn, completes an electrical circuit for driving the motor, even when the starting switch is placed in the "off" position when the operator takes his or her hand off the device.

However, in such a self-holding switch, the movable contact has ordinarily been fabricated from a flat strip, defining a leaf spring, which makes contact with a mating fixed contact by virtue of its resilient property. Accordingly, this requires using material with strong spring properties in order to ensure sufficient contact pressure between the movable contact and the fixed contact.

However, on the other hand, it has been a common practice in designing a return spring, for urging the pickup, to have a comparatively weak spring property which is sufficient, only, to return the light weight pickup, but not so strong as to take the stylus of the pickup out of engagement with the recorded groove. Consequently, it is impossible, with prior art devices, to use a movable contact made of a material having a high spring property. This use of material with weak spring property material has caused insufficient contact pressure, which results in various kinds of malfunctions.

In addition, if such a leaf spring is directly applied, as the movable contact of a self-holding switch, locational adjustment of the contact, with respect both to the mating fixed contact and to the location of the returning point of the pickup, becomes very difficult. This is due to the relation between the spring property of the relating parts, thereby rendering the setting thereof very difficult.

Furthermore, use of such leaf spring is liable to cause, in mass production, lack of uniformity in the spring length necessary for positioning it to the specific returning point of the pickup. This results in variations in the moment of force given by the movable contact to the pickup, which holds the movable contact in position. This invention aims to obviate such drawbacks as mentioned above.

OBJECT OF THE INVENTION

Accordingly, an object of the present invention is to provide a movable contact for a self-holding switch which can be used, without being greatly affected by the balance of resilient force, relative to that of the returning spring of the pickup, and which also ensures a sufficient contact pressure between these two mating contacts.

Another object of the invention is to enable ready setting of the movable contact of the self-holding switch and, thereby, to facilitate production and assembly.

A further object of the invention is to provide movable contacts having exact and constant spring properties, which are used for each self-holding switch of a sound reproducing device.

SUMMARY OF THE INVENTION

The present invention provides a self-holding switch of a sound reproducing device, wherein a movable contact is held by a pickup, when it has returned to the starting point of sound reproduction as urged by a return spring, to interrupt the electric current from the power source to a motor for driving a record disc.

The movable contact is fabricated of a spring wire, the medial or halfway portion of which is wound around a pin disposed on the casing of the sound reproducing device. One free end of the spring is rested on a suitable part of the casing and the other free end is rested at the medial point or halfway of a two-armed lever, which is received by the pin, the pin being coaxial with the movable contact.

The self-holding switch also includes a fixed contact. The fixed contact of the self-holding switch is disposed at such a position that it can contact the half-way portion of the movable contact, between the portion rested on the lever, and the portion where it is wound around the pin. The lever is, also, constructed in such a manner that its one arm, extending toward the starting point of sound reproduction of the pickup, has an effective arm length, from the pin, larger than the length of the part of the movable contact from the point rested on the other arm of the lever to the portion being wound around the pin.

By virtue of this construction, since the movable contact of the self-holding switch can be actuated by the pickup, through the lever, under a sufficient moment of force, the movable contact can be used by keeping sufficient contact pressure with the fixed contact, without being affected by any delicate adjustment in keeping the balance of spring forces between the two mating contacts.

In addition, this construction, also, enables ready setting of the movable contacts of the self-holding switches and facilitates the making and assembly thereof. Moreover, this construction provides movable contacts for self-holding switches having an exact and uniform spring property.

For a more complete understanding of the present invention reference is made to the following detailed description and accompanying drawing. In the drawing, like reference characters refer to like parts throughout the several views in which:

DETAILED DESCRIPTION OF THE PREFERRED EMBODIMENTS

Figure 1:
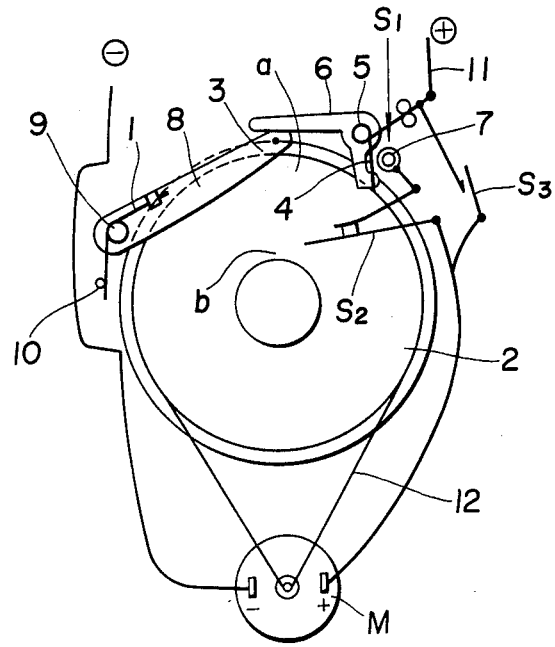
FIG. 1 is a plan view of a major part of sound reproducing in accordance with the present invention.
Figure 2:
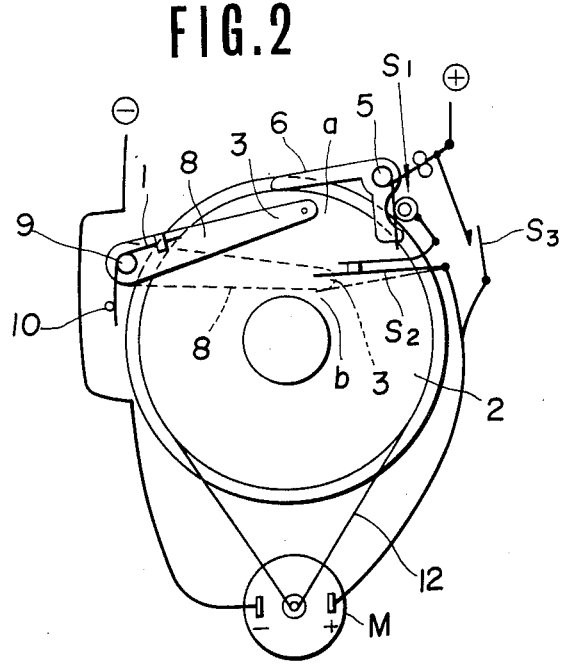
FIG. 2 is a plan view of the device hereof showing the device at a different point of operation.

FIGS. 1 and 2 are plan views showing an embodiment of the present invention following its sequence of operation. In the drawings, the casing and some other components are not shown for purposes of clarity.

As shown in the drawing, a sound reproducing device includes a pickup 3 disposed at the forward free end of a so-called tone arm 8 and is a part thereof. The pickup is mounted on the lower face of a sound reproducing stylus (not shown) and projects downwardly therefrom.

The other or fixed end of the tone arm 8 is received by a pin 9. The tone arm is reciprocally swingable above the recorded face of a record disc 2, between the starting point of sound reproduction "a" and the end point "b". The tone arm 8, also, moves away from, as well as returning toward, the recorded face of the record disc 2.

A return coil spring 1, fabricated of a metal wire, is wound around the pin 9. The coil spring 1 is received around the pin 9 at its coiled halfway portion. One end of the coil spring 1 is rested on the upper face of the tone arm 8 to urge it to move in the direction from the end point "b" to the starting point of sound reproduction "a", as well as upwardly. The other end of the spring 1 is rested on the side face of a post 10 which projects uprightly on the casing (not shown).

By virtue of this construction, the pickup 3 can be urged, normally, to move toward the starting point of sound reproduction "a" as well as to move away from the recorded face of the record disc 2.

A self-holding switch S1 includes a movable contact 4 made of a spring wire, the coiled middle portion of which is rested around a pin 5 inserted into the casing. One free end of the spring wire is rested on a set post 11 mounted on the casing. The other end of the coil spring 4 is rested on a lever 6 which is received by the pin 5, the pin 5 being coaxial with the spring 4.

The material for fabricating the movable contact is selected from those having a spring force strong enough to contact the fixed contact 7 with sufficient contact pressure.

A fixed contact 7 confronts the movable contact 4 at the halfway point between where the movable contact 4 is rested on the lever 6 and the point at which the contact rests around the pin 5.

The lever 6 has an L-shaped configuration and is freely received, at its deflected portion, by the pin 5. One end or first arm of the lever 6 has a hook on which one end of the movable contact 4 is rested. The other end or second arm of the lever 6 extends up to the starting point "a" of the record disc 2.

The second arm of the lever 6 which extends to and confronts the starting point of sound reproduction "a" is normally urged by the movable contact 4 toward the end point of sound reproduction "b". In addition, the portion of the movable contact 4, from the portion on which the free end of the movable contact rests, to the pin 5, is normally urged in a direction to contact the fixed contact 7.

The other end or second arm of the lever 6 is positioned such that its one side face facing toward the end point of sound reproduction "b" is engaged by the pickup 3. The portion of the lever 6, along which the pickup 3 engages, is dimensioned to have a distance from the pin 5 longer than that of the length of the lever 6 from the point to which the movable contact 4 is rested up to the pin 5.

By virtue of these two different lengths there is obtained a moment of force impaired to the lever 6 which is sufficiently larger than that imparted by the resilient force of the movable contact 4.

The device hereof, also, includes a motor M which drives a record disc 2 via a belt 12.

The device according to this invention includes structure such as a stylus pressure spring (not shown) and a means for releasing the stylus pressure (not shown). These means are well-known to the skilled artisan and are eliminated from the drawing for purposes of clarity.

The electric circuit for regulating the motor M is constituted as follows:

One of the power source terminals is connected to a movable contact of a terminating switch S2. The movable contact of the terminating switch S2 comprises a leaf spring, the forward tip end of which extends toward the end terminal of the end point "b" of the record disc 2 at which the pickup 3 swingably arrives. Upon arrival of the pickup 3 at the end point of sound reproduction "b", the forward tip end of the movable contact is held in position by the pickup 3. A fixed contact of the terminating switch S2 is directed to a point somewhat deviated toward the starting point of sound reproduction "a". Thus, the movable contact of the switch S2 is urged by its own resilient property to contact the fixed contact thereof.

This fixed contact is connected to the fixed contact 7 of the self-holding switch S1.

One end of the movable contact 4 is connected to the plus side of the power source.

In other words, the self-holding switch S1 and the terminating switch S2 are connected in series between the motor M and the power source.

The device, also, includes a starting switch S3 which is connected in parallel to the series connection of the self-holding switch S1 and the terminating switch S2.

The other terminal of the motor M is connected to the minus pole of the power source.

In operation the device of the invention works as follows:

As shown in FIG. 1 since the self-holding switch S1, which is held by the lever 6, via the pickup 3, at rest at the starting point of sound reproduction "a", the switch S1 is kept "off". At the same time, the starting switch S3 is also kept "off", and, therefore, the motor M does not rotate.

Upon an operator's closing of the starting switch S3, an electric circuit, in the order from the motor M, starting switch S3, the power source and, again, to the motor M, is completed. Then, the motor M rotates. Because of the motor rotation, the record disc 2 is, also, rotated. Simultaneously, swing motion of the pickup 3 is achieved via the sound reproduction stylus, which engages the recorded face of the record disc 2, from the starting point of sound reproduction "a" to the end point of sound reproduction "b". The swing motion of the pickup 3 will release the lever 6 of the self-holding switch S1 from the restriction given by the pickup 3. Then, the movable contact 4 will move, due to its own resilient force, and contact the fixed contact 7. Then, an electric circuit is newly completed connecting the motor M, the terminating switch S2, self-holding switch S1, the power source and, again, the motor M, thus, allowing the motor M to rotate by the current passing through the circuit.

Accordingly, the motor M does not stop and the record disc 2 continues rotation for sound reproduction, even if the operator takes his hand away from the starting switch. Since the movable contact 4 of the self-holding switch S1 is fabricated of a material having a sufficiently high spring property, electrically sufficient contact pressure can be obtained between the movable contact 4 and the fixed contact 7.

When the pickup 3 arrives at the end point of sound reproduction, as shown by a dash line in FIG. 2, after having finished its sound reproduction, the pickup 3 will hold the movable contact of the terminating switch S2, as shown by the other dash line. In this way, the electrical connection from the motor M, the terminating switch S2, the self-holding switch S1, the power source and returning, again, to the motor M is opened at the terminating switch S2. Thus, the motor M stops its rotation together with the record disc 2.

Releasing of the stylus pressure at this position, will allow the pickup 3, by virtue of the spring force supplied by the turn or coil spring 1, to return to the starting point of sound reproduction "a" and, thus, hold the lever 6 of the self-holding switch S1, again, and open the self-holding switch S1. At the same time, the pickup 3, also, releases its holding of the movable contact of the terminating switch S2 and turns it "ON". Thus, the next closing of the starting switch S3, will allow the device to start the next operation of sound reproduction.

Having, thus, described the invention what is claimed is:

1. A self-holding switch adapted for a sound reproducing device which has a power source, a motor driven by the power source, a record disc driven by the motor, a pickup engageable with the disc from a starting point for sound reproduction to a point at which sound reproduction ends, the pickup being returnable to the starting point by a return spring, the device being disposed in a casing, the self-holding switch comprising:

a rotatable lever having first and second arms, the lever biasingly urged in one rotational direction, the lever being releasably held in the opposite rotational direction by the pickup when it is at the starting point of sound reproduction;

a pin mounted to the casing, the lever pivotally mounted on the pin;

a movable contact mounted on the lever, the movable contact made of a length of resilient spring wire having a first end and a second end, the wire wound around the pin midway between the first and second ends, the first end of the wire connected to the casing, the second end of the wire connected to the first arm of the lever, the resilient wire urging the lever in said one rotational direction;

a first contact positioned proximate to the movable contact mounted on the lever such that the first arm of the lever matingly abuts the first contact bringing the second end of the resilient wire into releasable engagement with the fixed contact when the pickup engages the record disc;

wherein the second arm of the lever extends toward and contacts the pickup when the pickup is at the starting point such that the distance between the pin and the point of contact between the pickup and the second arm is larger than the distance between the pin and the point of contact between the first arm and the fixed contact; and wherein the first arm of the lever and the movable contact mounted thereon are moved out of engagement with the fixed contact, against the biasing force exerted by the movable contact by the pickup as the biasing force exerted on the pickup by the return spring returns the pickup to the starting position.

2. A self-holding switch in a sound reproducing device as claimed in claim 1, wherein said lever has an L-shaped configuration mounted onto the pin at its rotating point.

* * * * *